Figures 1, 2:
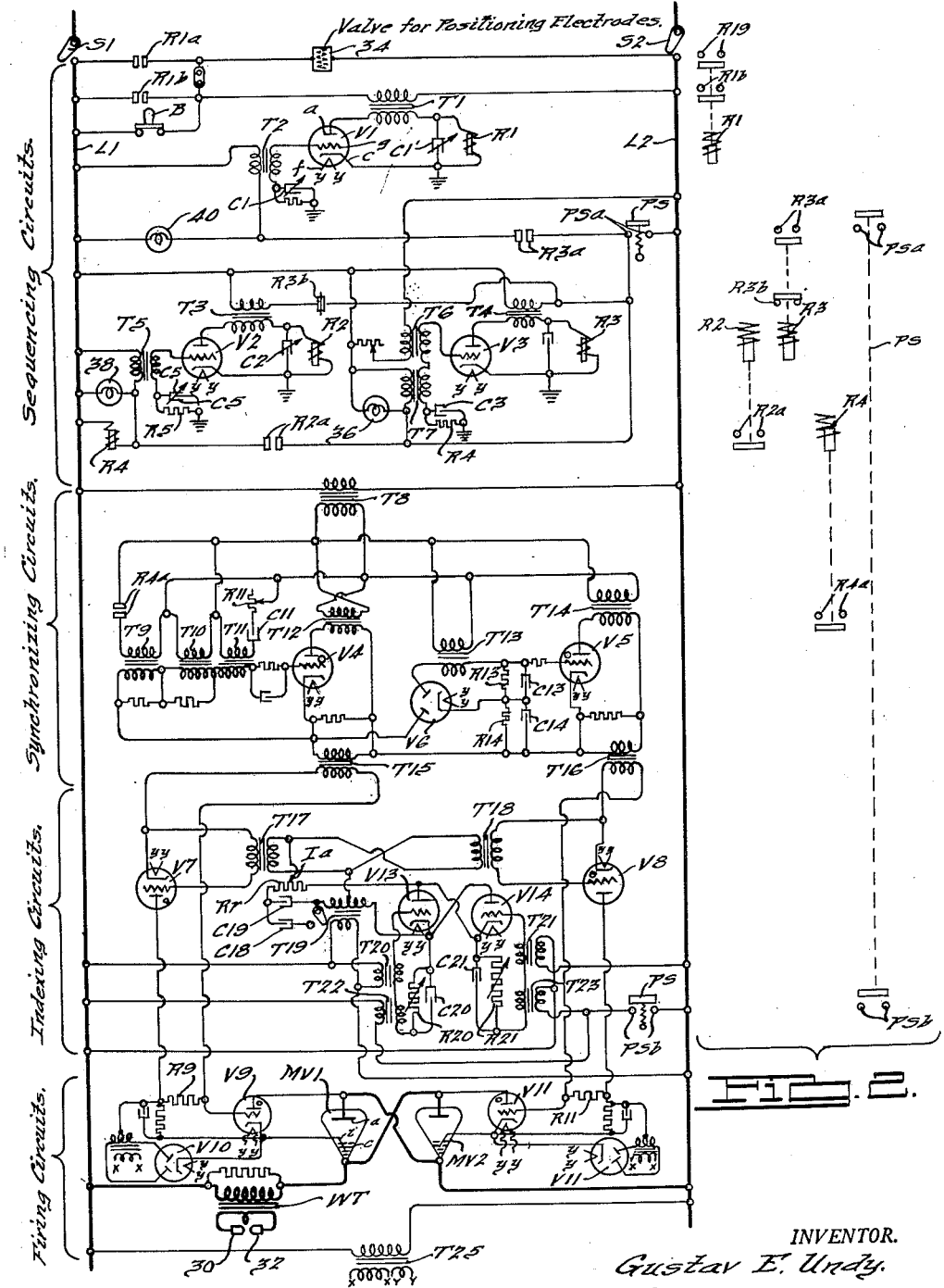

Feb. 19, 1963 G. E. UNDY 3,078,390
PHASE SHIFT CONTROL
Original Filed Oct. 15, 1949 2 Sheets-Sheet 1

INVENTOR.
Gustav E. Undy.
BY
Harness, Dickey & Pierce.
ATTORNEYS.

Feb. 19, 1963 G. E. UNDY 3,078,390
PHASE SHIFT CONTROL
Original Filed Oct. 15, 1949 2 Sheets-Sheet 2
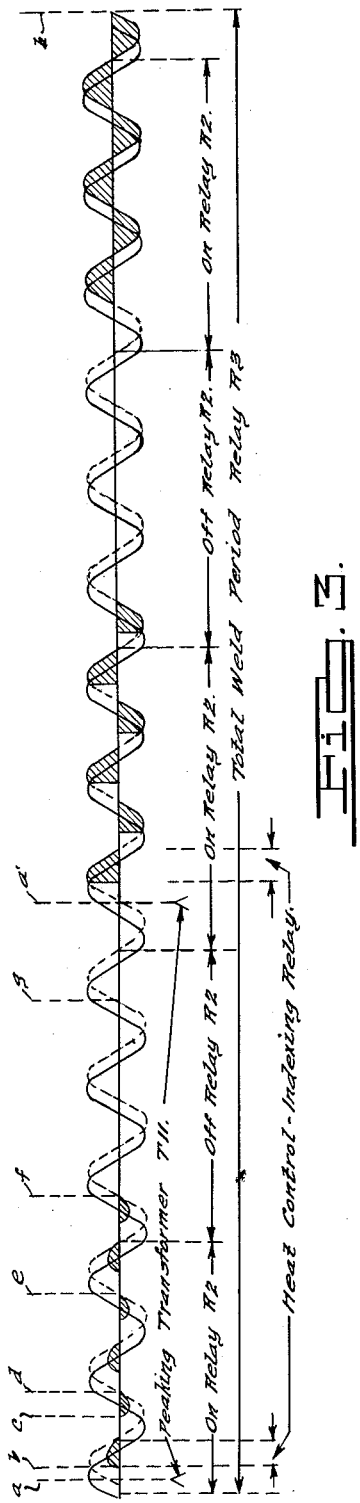
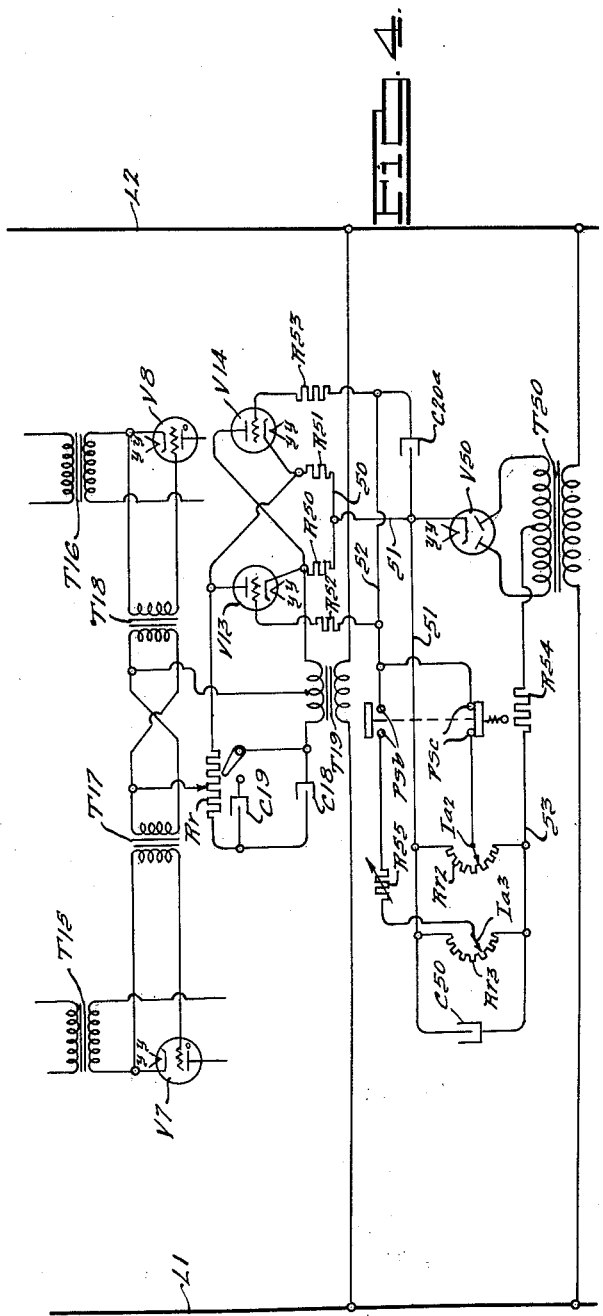
INVENTOR.
*Gustav E. Undy*
BY
*Harness, Dickey & Pierce.*
ATTORNEYS.

United States Patent Office 3,078,390
Patented Feb. 19, 1963

3,078,390
PHASE SHIFT CONTROL
Gustav E. Undy, Southfield, Mich., assignor to Weltronic Company, Southfield, Mich., a corporation of Michigan
Continuation of application Ser. No. 121,576, Oct. 15, 1949. This application Sept. 30, 1960, Ser. No. 60,542
47 Claims. (Cl. 315—197)

This invention relates to electrical control systems, and in its illustrated form, is directed primarily to the provision of an improved welding control system.

This application is a continuation of copending application, Serial No. 121,576, filed October 15, 1949, now abandoned, which was a continuation-in-part of application Serial No. 610,351, filed August 11, 1945, which was a division of an application by applicant filed July 18, 1941 which issued into Patent No. 2,401,780 on June 11, 1946, and the disclosure of all are incorporated herein by reference.

The principal objects of the present invention are to provide a control system of the above type, which is simple in arrangement, economical of manufacture, and which is extremely efficient and accurate in its operation; to provide such a system utilizing electronic valves to commutate at least those circuits, the timing whereof is critical; to provide such a system arranged to provide an over-all period of welding flow, during which period the welding current is supplied to the welding circuit as a succession of impulses, each whereof is of predetermined length and each whereof is followed by a cooling period of predetermined length; to provide such a system wherein the successive impulses in each welding period are of progressively increasing current intensity; to provide such a system wherein each current impulse is made up of a fraction of each of a predetermined number of half-cycles of current flow of one polarity and a corresponding fraction of each of a predetermined number of half-cycles of opposite polarity and in which the just-mentioned fractions are progressively increased during the welding period; and to provide such a system wherein the increase in the aforesaid fractions of current intensity is effected by indexing means which functions automatically as a consequence of the initiation of the welding period and which automatically resets itself at the conclusion of the welding period.

Further objects of the present invention are to provide a control system of the above-indicated type, embodying improved means for causing each impulse of welding current flow to be introduced by a half-cycle or fraction of a half-cycle of one polarity and to be terminated by a half-cycle or a fraction of a half-cycle of opposite polarity; to provide such a system wherein each operation of the primary control means produces at least two electrical impulses having a displacement of 180 electrical degrees, one of said electrical impulses resulting in the delivery to the welding circuit of an impulse of welding current of one polarity and the other said electrical impulse resulting in the delivery to the welding circuit of an impulse of welding current of opposite polarity; and to provide such a system wherein the aforesaid electrical impulses are produced by a common impulse producing means which upon being actuated immediately produces the first said electrical impulse and stores energy which is released a half-cycle later, so as to produce the second-mentioned electrical impulse.

With the above, as well as other and more detailed objects in view, preferred but illustrative embodiments of the invention are shown in the accompanying drawings, throughout the several views of which corresponding reference characters are used to designate corresponding parts and in which:

FIGURE 1 is a diagrammatic view of a welding control system embodying the invention;
FIGURE 2 is a legend which indicates the mechanical relation between the solenoids and the contacts which are operated thereby in the system of FIGURE 1;
FIGURE 3 is a diagrammatic representation which illustrates certain of the timing relations provided by the system of FIGURE 1; and
FIGURE 4 is a diagrammatic view of circuits illustrating a modified indexing arrangement.

It will be appreciated from a complete understanding of the present invention that, in a generic sense, the improvements thereof may be embodied in electrical control systems intended for various specific purposes, and that such control systems may be variously arranged. In its present preferred form, the invention is utilized to control electric welding circuits of the impulsing type, and by way of illustration but not of limitation, the invention is so disclosed herein.

Referring to FIGURE 1, the present control system comprehends four interrelated groups of circuits, as indicated by the legends appearing along the lefthand side of the diagram. The first of these sets of circuits controls what is known in the trade as the sequencing of the system. That is to say, these circuits respond to a manual or other suitable operator, indicated herein as a push button B, and serve to operate the mechanism which brings the electrodes into clamping engagement with the work and releases such clamping engagement to initiate a sequence of operations, which results in the initiation of flow of welding current, to control the length of each impulse of welding current and the interval between each such impulse, and to determine the over-all length of the welding period.

The second group of circuits, indicated by the legend "Synchronizer," responds to the sequence circuits, and serves to cause each impulse of welding current to be introduced by a fraction or all of a half-cycle of one polarity and to be terminated by all or a fraction of a half-cycle of opposite polarity.

The third group of circuits, indicated by the legend "Indexing Circuits" cooperates with the synchronizing circuits in controlling the initiation of each impulse of welding current, and serves to determine the fraction of each half-cycle of the supply source during which welding current is delivered to the welding circuit.

The remaining group of circuits, indicated by the legend "Firing Circuits," responds to the sequence, synchronizing and indexing circuits, and serves to directly initiate and interrupt the flow of welding current to the welding transformer.

The sequencing circuits embodying the invention are disclosed and claimed in the application of Cletus J. Collom, Serial No. 222,825, filed August 3, 1938, now Patent No. 2,289,320 dated July 7, 1942, and assigned to the assignee hereof, and as shown, utilize a series of three electronic valves V1, V2 and V3, a corresponding series of solenoid operated relays R1, R2 and R3, together with a fourth such relay R4, and a series of transformers T1 through T7, which are associated with the grid and plate circuits of the electronic valves in the hereinafter described relation. The valves V1, V2 and V3 may be and preferably are of the evacuated type, each having an anode $a$, a control grid $g$, a cathode $c$, and a filament $f$. As will be understood, these valves are of the type which are nonconducting so long as the potential between the grid and cathode is below a critical value and may be rendered conducting during half cycles in which the anode is positive with respect to the cathode by increasing such potential above the critical value. The relays R1, R2, R3 and R4 are of conventional type and are provided with normally open and normally closed contacts in the relation specified in the legend, FIGURE 2. It is thought that the remaining details of the sequence circuits may best be understood by a description of the operation of the system.

The synchronizing circuits embody certain improvements upon the invention described and claimed in the application of Cletus J. Collom, Serial No. 325,553, filed March 23, 1940, now Patent No. 2,289,321, dated July 7, 1942, and utilize a pair of related valves V4 and V5 and a cooperating full wave rectifier V6. Valves V4 and V5 may be and preferably are of the gas filled type and are each provided with an anode. It will be appreciated that while these valves are normally nonconducting, they may be rendered conducting by applying critical potential between the grids and cathodes thereof during half-cycles in which the anodes are positive, and that when so rendered conducting, they remain so for the balance of the corresponding half-cycle of current flow. The valve V4 is provided with input and output transformers T12 and T15, respectively, and with grid transformers T9, T10 and T11. The valve V5, in turn, is provided with input and output transformers T14 and T16, respectively, and is provided with a grid transformer T13. As is described in more detail below, the grid transformer T10 serves to normally apply a potential to the grid of the valve V4, which is 180° out of phase with the plate voltage thereof, and consequently normally maintains valve V4 in nonconducting condition. Transformer T11 applies to the grid of valve V4, in each successive half-cycle, a voltage of peaked wave form, at a time in each half-cycle which is determined by the associated phase shift elements R11 and C11. The peaked voltages thus applied to the grid of valve V4 by transformer T11 are not of sufficient value to overcome the bias of transformer T10 except during half-cycles in which transformer T9 is energized. The latter transformer, when energized, neutralizes the effect of transformer T10, and transformer T9 is periodically energized in accordance with the operation of relay R4, which responds, as described below, to the aforesaid sequencing circuits. The connections for valve V4 and its related transformers are such that the critical or operating voltage is applied to the grid thereof only during positive half-cycles.

The connections for transformer T14, associated with valve V5, are the reverse of those for transformer T12, and consequently, valves V4 and V5 are disposed to be rendered conducting during alternate half-cycles. For purposes of description, as aforesaid, the half-cycles in which valve V4 passes current are herein referred to as the positive half-cycles, and consequently the half-cycles in which valve V5 conducts, are herein referred to as the negative half-cycles. Transformer T13 and rectifier V6 cooperate to maintain a negative bias on the grid of valve V5 during the negative half-cycles, and for this purpose, the output of rectifier V6 is delivered to a condenser C13, which is connected in parallel with an associated resistor R13. In order to render valve V5 conducting in a negative half-cycle immediately following a positive half-cycle in which valve V4 has conducted current, the output circuit of valve V4 is connected, through rectifier V6, to apply charging current to condenser C14, which is provided with a discharge resistor R14. The relation is such, as is described in more detail below, that during each positive half-cycle of current flow, in which valve V4 conducts, condenser C14 is charged to a potential sufficiently above the charging potential of condenser C13 to bring the grid of valve V5 to a potential at which, if the anode of valve V5 were positive, valve V5 would conduct current. During the positive half-cycle in question, the anode of valve V5 is negative, and consequently, the application of this charge to condenser C14 does not initiate a flow of current through valve V5. At the beginning of the immediately following negative half-cycle, however, the anode of valve V5 becomes positive with respect to the anode, and as soon as the critical anode-cathode voltage across valve V5 is reached, a flow of current is initiated through valve V5.

During that part of the positive half-cycle in which condenser C14 is charged and throughout which the potential applied to condenser C14 is below the maximum charging potential thereof, condenser C14 is enabled to discharge through the discharge resistor R14. The characteristics of this discharge circuit are such that the charge on condenser C14 remains at a sufficiently high value to maintain a conducting potential on the grid of valve V5 long enough to initiate the discharge of the latter at the beginning of the next negative half-cycle, as aforesaid. The characteristics of the discharge circuit for condenser C14 are, however, such that if another charging current is not applied to condenser C14 in the next succeeding positive half-cycle, the charge thereon will have fallen to such a value that, by the time the next succeeding negative half-cycle is initiated, the biasing condenser C13 is able to apply a blocking potential to the grid of valve V5. Valve V5 is, therefore, rendered conducting at the beginning of each negative half-cycle, which follows a positive half-cycle in which valve V4 conducts current.

The output circuit of valve V4 is coupled, through transformer T15 and valve V7, to the grid circuit of the firing valve V9, and the output circuit of valve V5 is correspondingly related, through transformer T16 and valve V8, to the grid circuit of the firing valve V11. Valves V7, V8, V9 and V11 are preferably of the same type as valves V4 and V5, and the associated rectifiers V10 and V12 are preferably of the same construction as rectifier V6.

Rectifiers V10 and V12 are conventionally connected to normally apply negative bias voltages to the grids of valves V9 and V11, respectively, which bias voltages are 180° out of phase with the anode voltages thereof and which, consequently, normally maintain valves V9 and V11 in a nonconducting condition. The voltages for overcoming the just-mentioned bias voltages are applied across the related resistors R9 and R11, respectively, and are applied through the valves V7 and V8.

It will be appreciated, therefore, that the time in each positive half-cycle at which valve V9 is rendered conducting is determined by the time in such half-cycle at which valve V7 is rendered conducting. Similarly, the time in each negative half-cycle at which valve V11 is rendered conducting is determined by the time in such negative half-cycle at which valve V8 is rendered conducting. In accordance with the present invention, the grid potentials of valves V7 and V8 are controlled, respectively, by the associated transformers T17 and T18, which derive energy from a timing transformer T19. The midpoint of the secondary winding of transformer T19 is connected to one terminal of transformer T17 and to an opposite terminal of transformer T18. The secondary circuit of transformer T19 includes a potentiometer resistor Rr one terminal of which is connected to one terminal of each of a plurality of parallelly connected condensers C18 and C19 having their other terminals connected to one end terminal of the secondary winding of transformer T19. The other end terminal of the transformer T19 is connected through a pair of back-to-back arranged valves V13 and V14 of the continuous control high vacuum type to the other terminal of the resistor Rr. Resistor Rr is provided with a movable tap Ia, which is directly connected to the remaining terminals of the secondary windings of transformers T17 and T18 and provides for manual adjustment of the phase shifting circuit. The constants of the just-mentioned secondary circuit, associated with transformer T19, are such, as will be understood, that for each position of the adjustable tap Ia along the resistor Rr the maximum voltage developed by transformers T17 and T18 is of a substantially fixed value, but the position of the tap Ia along the resistor Rr in conjunction with the valves V13 and V14 determines the point in each half-cycle at which such maximum voltage is reached. Thus, after once the tap 1a is adjusted along the resistor Rr, the point in each positive half-cycle at which transformer T17 becomes effective to initiate a discharge through valve V7 may be varied throughout a range of substantially 180° by varying grid bias on the valves V13 and V14 to change the current flow therethrough and to thereby control the effective resistance in this leg of the phase shifting circuit. The same adjusting of the grid bias of valves V13 and V14 correspondingly adjusts the time in each negative half-cycle at which transformer T18 is effective to initiate a discharge through the valve V8. Preferably and to insure a smooth progression in the firing points of valves V7 and V8, condensers C18 and C19 are proportioned so that the voltage across the valves V13 and V14 and the potentiometer resistor Rr is leading with respect to the voltage transformer T19, it being understood, of course, that with this relation the connections for transformers T17 and T18 are such that the voltages of these transformers lag the voltage of transformer T19, which is in phase with the voltage across the welding transformer.

It will be appreciated that the expedient of dividing each over-all welding period of welding current flow into a succession of predeterminably spaced impulses has been resorted to in the trade, both for the purpose of protecting the welding electrodes and for the purpose of promoting a desired diffusion of the heat through the work to be welded. In present day welding practice, it is conventional to provide each electrode with artificial cooling means, and these artificial cooling means may be expected to return the associated electrode to a normal or cold condition in the interval between successive impulses of welding current. During the course of each such impulse, on the other hand, the electrodes rise in temperature.

It has been found in accordance with the present invention that the efficiency of certain types of welds may be materally increased, and the life of the electrodes may be prolonged if the intensity of the welding current is varied in accordance with a predetermined pattern during each over-all period of welding current flow. More particularly, it has been found that decided improvements can be effected by progressively increasing the welding current intensity from an initial value which may be a minimum value during the first impulse to a final value which may be a maximum value in the last one of several impulses.

Accordingly, in accordance with the present invention, the variation in the point at which valves V7 and V8 are rendered conducting is affected by introducing a progressively variable resistance into the circuit of the transformer T19, which supplies energizing current to the grid transformers T17 and T18, associated, respectively, with valves V7 and V8. Transformers T20 and T21 are introduced in the grid circuits of valves V13 and V14, respectively, and these transformers are energized upon initial closure of the disconnect switches S1 and S2, as is indicated by the direct connection of these transformers across the line conductors L1 and L2. Upon being energized, transformers T20 and T21 bring the grids of valves V13 and V14 to values at which these valves interpose a maximum resistance into the circuit of transformer T19 and, consequently, delay, to the maximum extent, the point in the load current wave at which valves V7 and V8 are rendered conducting. Upon being energized, also, transformers T20 and T21 charge up the associated biasing condensers C20 and C21.

The grid circuits of valves V13 and V14 are also provided with balancing transformers T22 and T23, which are energized at the beginning of a welding cycle in response to closure of auxiliary contacts PS1b on the pressure switch PS1. Upon being energized, transformers T22 and T23 balance out the voltages of transformers T20 and T21, and consequently render the grid potentials of valves V13 and V14 subject to the discharge actions of condensers C20 and C21. It will be understood that these latter condensers and their associated resistors R20 and R21 are adjusted so that the energy stored in condensers C20 and C21 is dissipated at a desired gradual rate, and that as the charge on these condensers progressively decreases, valves V13 and V14 interpose progressively less resistance in the circuit of transformer T19. As stated, the condensers in the circuit of transformer T19 are preferably proportioned so that the voltage across the potentiometer resistor is leading with respect to the voltage of transformer T19, and it will be understood that the reduction in resistance of the valves V13 and V14 serves to increase this angle of lead, thereby progressively advancing the points in the corresponding half-cycles at which the valves V7 and V8 are fired. During the discharge action of condensers C20 and C21, therefore, the point at which valves V7 and V8 are rendered conducting is progressively advanced, thereby progressively increasing the intensity of each impulse of welding current as will presently be described.

The firing valves V9 and V11 are conventionally connected between the anodes a and the igniter electrodes i of a pair of main gaseous discharge rectifiers MV1 and MV2. The latter rectifiers are reversely connected in circuit with the primary winding of the welding transformer WT, and may be and preferably are of the type sold commercially under the trade-name "Ignitron." As will be understood, these rectifiers, while normally nonconducting, become conducting if a critical potential is applied between the anodes and igniter electrodes thereof during a half-cycle in which the anodes are positive. When so rendered conducting, the rectifiers remain so for the balance of the corresponding half-cycle of current flow.

The valves V9 and V11, respectively, are provided with full wave rectifiers V10 and V11, which normally apply negative biases to the grids of the associated valves V9 and V11, so as to maintain these valves normally nonconducting which action, as will be understood, maintains the main rectifiers MV1 and MV2 normally nonconducting.

It is thought that the remaining details of the system may best be understood with reference to a description of the operation of the system. Assuming it is desired to condition the system for operation, the usual disconnect switches S1 and S2 may be closed, thereby connecting the line conductors L1 and L2 to the source of supply, which may be a conventional 60 cycle alternating current system.

The energization of line conductors L1 and L2 immediately energizes transformer T6, associated with the sequencing valve V3; transformer T8, which supplies power to the synchronizing, indexing and firing control circuits; energizes a transformer T25 to the secondary terminals whereof the reference characters x and y are applied; and energizes the grid control transformer T19, associated with valves V7 and V8.

Upon being energized, the heater transformer applies heating current to the filaments f of the sequencing valves V1, V2 and V3, and also applies heating current to the cathode of the synchronizing valves V4 and V5, the rectifier V6, the indexing valves V7 and V8, the firing valves V9 and V11, and the rectifiers V10 and V12, to which the reference characters x and y are also applied.

Upon being energized, transformer T6 applies a negative bias to the grid of the sequencing valve V3, which action renders the same nonconducting and prevents energization, for the time being, of the overall timing relay R3.

Upon being energized, transformer T8 applies energizing currents to the input transformers T12 and T14, associated with valves V4 and V5, and also energizes the bias transformers T10 and T13, associated with the grid circuits of valves V4 and V5. The connections for transformer T10 are such that upon being energized, this transformer applies a negative bias to the grid of valve V4 and maintains the same nonconducting. Similarly, transformer T13 is effective to charge condenser C13 through rectifier V6 and apply a negative bias to the grid of valve V5, thereby normally maintaining the same nonconducting. The energization of the input transformers T12 and T14 is consequently without immediate effect.

The energization of transformer T8 also energizes the peaking transformer T11, which is associated with the grid circuit of valve V4 and which transformer may be conventionally constructed so as to deliver a voltage wave of peaked form. The connections for transformer T11 are such as to apply a positive potential to the grid of valve V4 in each positive half-cycle of the source, that is to say, in each half-cycle in which the transformer T12 renders the anode of valve V4 positive. As will be understood, the point in each such positive half-cycle at which the maximum potential of transformer T11 is developed is adjustable by varying the illustrative phase shift elements R11 and C11, associated with the primary winding of transformer T11, and preferably the adjustment is such that the maximum potential is applied at the point designated $a$ in FIG. 3, which point corresponds to the zero point of the hypothetical welding current wave I. It will be noted in FIG. 3 the just-mentioned current wave I lags with respect to the voltage wave E, which latter wave indicates the voltage applied between the line conductors L1 and L2. As aforesaid, the potential developed by transformer T11 is insufficient to overcome the effect of the bias transformer T10, and consequently valve V4 remains nonconducting until such a time as transformer T9 is energized, as described below.

The energization of transformer T19 delivers current through the potentiometer circuit comprising the resistor Rr, valves V13 and V14, and the associated condensers C18 and C19 to the transformers T17 and T18. The latter two transformers are connected, respectively, to apply a conducting potential to the grid of valve V7 in each positive half-cycle, and to apply a conducting potential to the grid of valve V8 in each negative half-cycle. As aforesaid, the point in each such positive and negative half-cycles at which the grids of valves V7 and V8, respectively, reach their conducting potentials is determined by the setting of the tap Ia along the potentiometer resistor Rr and by the grid to cathode bias on the valves V13 and V14 in accordance with the preferred practice of the invention, the normal such positioning is one which delays the application of such conducting potentials until the time represented by the vertical line $b$ in FIG. 2, which, as described below, prevents the firing of the main rectifiers MV1 and MV2 until late in each corresponding half-cycle, and consequently delivers current of relatively low intensity to the welding transformer WT.

Assuming the work has been positioned between the electrodes 30 and 32, which are herein illustrated as conventional spot welding electrodes, a welding operation may be initiated by closing the pilot switch B. The latter action completes an obvious energizing circuit for the solenoid 34, which is illustrative of a conventional electromagnetically operated valve which may be associated with the usual means, not shown, for actuating the electrodes 30 and 32 into clamping engagement with the work with a suitable welding pressure.

Closure of the switch B also completes an obvious energizing circuit for the primary winding of the transformer T1, associated with valve V1. Under the conditions stated, the transformer T2 is de-energized and consequently the grid of valve V1 is at a conducting potential. Accordingly, upon being energized, transformer T1 is enabled to pass current through the valve V1 and energize the sequencing relay R1, which thereupon closes its contacts R1a and R1b.

Contacts R1a and R1b are connected in parallel with each other through the now closed change-over switch S3, and in the instance now being described, function jointly to complete a self-holding circuit for the valve solenoid 34 and transformer T1.

The energization of solenoid 34, as described above, results in bringing the electrodes 30 and 32 into engagement with the work, and the pressure thus developed functions in a well known manner to close the conventional spring biased pressure switch PS. Closure of the contacts PSa of the switch PS immediately completes energizing circuits for the transformers T3 and T4, associated with valves V2 and V3, and also energizes transformer T7, which is associated with the grid circuit of valve V3. Closure of the contacts PSa also completes an obvious circuit for the indicating lamp 36, which thereupon lights up and remains lighted until the welding cycle is completed.

Under the conditions stated, transformer T5 is de-energized and, consequently, upon being energized, transformer T3 is enabled to pass current through valve V2 and energize impulsing relay R2.

Upon being energized, relay R2 closes its contacts R2a and R2b. Closure of contacts R2a completes obvious energizing circuits for transformer T5, indicating lamp 38 and the winding of control relay R4. As will be understood, lamp 38 serves to indicate the on and off condition of the impulsing circuit comprising relay R2.

Upon being energized, relay R4 closes its contacts R4a, which are associated with transformer T9 in the synchronizing circuits. The effect of this action is described below.

The energization of transformer T5 results in the charging up of the variable off-time condenser C5, which action applies a blocking potential to the grid of valve V2 and immediately interrupts the flow of current therethrough.

When the flow of current through valve V2 is interrupted, the energy previously stored in the variable on-time condenser C2 by transformer T3 is enabled to discharge through the winding of relay R2, and this energy maintains relay R2 energized for a predetermined interval. In the diagrammatic view of FIG. 3, the on period of relay R2 is indicated as being approximately three full cycles in length. It will be made clear at a later stage of the description that an accuracy of plus or minus one half-cycle in the timing of condenser C2 is sufficient.

As soon as condenser C2 times out, relay R2 resumes the de-energized position, re-opening its contacts R2a which de-energizes the control relay R4 (which thereupon opens its contacts R4a) and also de-energizes transformer T5 and extinguishes lamp 38.

The de-energization of transformer T5 enables the energy previously stored in the off-time condenser C5 to start discharging through the associated resistor R5. At the expiration of an interval determined by the characteristics of condenser C5 and resistor R5, the grid of valve V2 becomes sufficiently positive to enable transformer T3 to again pass current through valve V2. The off-time interval thus afforded by condenser C5 may obviously be extended for any desired period, an off-time of approximately three cycles in length being indicated in FIG. 3. As appears in the later description, an accuracy of plus or minus one half-cycle in the timing afforded by condenser C5 is satisfactory.

As soon as valve V2 again becomes conducting, relay R2 is again energized with the result mentioned above. As before, also, the energization of relay R2 applies a blocking potential to the grid of valve V2, which results in the de-energization of relay R2. So long as transformer T3 is energized, therefore, relay R2 alternates between energized and de-energized conditions, the length of each energized period being determined by condenser C2 and the length of each de-energized period being determined by condenser C5.

The energization of transformer T7 neutralizes the effect of the blocking transformer T6, associated with valve V3, and ultimately results in the energization of relay R3 to thereby limit the welding period. Since the functioning of relay R3 is delayed until the end of the welding period, a detailed description of its energization is deferred until a later stage of the description.

Each closure of contacts R4a of relay R4 completes an obvious energizing circuit for the primary winding of transformer T9, which is differently connected with respect to transformer T10 and neutralizes the effect of transformer T10 to a sufficient extent to enable the peaked potential of transformer T11 to bring the grid of valve V4 to a conducting value. It will be recalled from previous description that at the stage indicated by the reference character a in FIG. 3, of each successive half-cycle of the voltage wave E, transformer T11 develops the just-mentioned peaked potential. During negative half-cycles, the anode of valve V4 is negative, and consequently a neutralization of the effect of transformer T10 during a negative half-cycle is without effect. At the point a (FIG. 3) of the next positive half-cycle, following the neutralization of transformer T10, however, the peaked potential developed by transformer T11 is enabled to initiate a discharge of valve V4, in consequence of which the input transformer T12 is enabled to pass current through valve V4 and energizes the output transformer T15. Transformer T12 is also enabled to pass current through rectifier V6 and charge condenser C14 to a predetermined potential. As aforesaid, the fully charged potential of condenser C14 materially exceeds the fully charged potential of condenser C13, thereby immediately enabling condenser C14 to bring the grid of valve V5 to a conducting potential. During the half-cycle in question, however, the anode of valve V5 is negative and consequently no current passes therethrough.

Upon being energized, output transformer T15, associated with valve V4, applies a potential across resistor R9 and the principal electrodes of valve V7. At this stage of the positive half-cycle in question, however, valve V7 is nonconductive, and consequently the potential of the grid of valve V9 is not immediately altered by the energization of transformer T15. At the relatively late stage of the positive half-cycle in question, which is represented by the line b in FIG. 3, the voltage of transformer T17 reaches a sufficiently high value to render valve V7 conducting, enabling transformer T15 to pass current through valve V7 and build up a potential across resistor R9, which opposes the bias potential continuously applied to the grid of valve V9 through rectifier V10. The potential of transformer T15 materially exceeds the bias applied through valve V10, and consequently valve V9 is rendered conducting at substantially the same instant that valve V7 becomes conducting. At the time represented by the line b, therefore, in FIG. 3, which is determined by the potentiometer position to which the tap Ia is adjusted and the grid to cathode bias of valves V13 and V14, valve V7 operates to render the firing valve V9 conducting.

Upon being rendered conducting, valve V9 brings the potential of the igniter electrode i, associated with rectifier MV1, to approximately the same potential as the anode a of such rectifier, and consequently applies a substantial igniting potential between the igniter electrode i and the cathode c of such rectifier. The last-mentioned potential renders rectifier MV1 conductive and completes a circuit through rectifier MV1 for the primary winding of the welding transformer WT, which thereupon becomes effective to initiate a flow of welding current through the work. As will be understood, the current flow thus initiated through rectifier MV1 persists, due to the inductance of the welding load, for a period after the voltage wave E passes through the zero point.

Accordingly, at the time the current thus initiated through rectifier MV1 reaches zero value, the anode of rectifier MV1 is negative and this rectifier thereupon becomes nonconducting, interrupting the flow of current to the welding transformer WT.

At the beginning of the next or negative half-cycle of current flow, the polarity of transformer T14, associated with valve V5, reverses, bringing the anode of this valve to a positive value. At this time, although a portion of the charge applied to condenser C14 has become dissipated through the associated resistor R14, the potential of condenser C14 is still sufficiently in excess of the potential of condenser C13 to render valve V5 conducting. Accordingly, at the beginning of the negative half-cycle in question, transformer T14 is enabled to pass current through valve V5 and energize the associated output transformer T16. Upon being energized, transformer T16 applies a potential across resistor R11 and the principal electrodes of valve V8 in the same manner as was described with reference to the transformer T15. Also, at a point represented by the line c in FIG. 3, transformer T18 renders valve V8 conducting, which thereupon builds up a potential across resistor R11, which enables valve V7 to fire main rectifier MV2 in the same manner that main rectifier MV1 was fired at the time valve V7 was rendered conducting. Upon being rendered conducting, main rectifier MV2 transmits a negative impulse of current to the welding transformer WT of substantially the same intensity and wave form as was transmitted thereto by main rectifier MV1 during the preceding or first positive half-cycle.

At the point represented by the reference character d in FIG. 3, transformer T11 again applies its peak potential to the grid of valve V4. As previously stated, the "on" interval afforded by relay R2 is, in the example now being described, approximately three full cycles in length. Consequently, transformer T9 is still energized and effective to neutralize transformer T10 at the point d on FIG. 2. Under these conditions, therefore, transformer T12 is enabled to pass another impulse of current through valve V4, which impulse of current again energizes the output transformer T15 and recharges the timing condenser C14, associated with valve V5. As before, the energization of transformer T15 results in the firing of main rectifier MV1 and the delivery to the welding transformer of a second positive impulse of welding current. Similarly, the charging of condenser C14 enables transformer T14 to pass current through valve V5 at the beginning of the next succeeding negative half-cycle. The latter action results in the firing of main rectifier MV2 and the delivery to the welding transformer WT of a second negative impulse of welding current. Similar actions occur during the third positive and negative half-cycles, as will be apparent, and it will also be apparent that main rectifiers MV1 and MV2 are alternately fired so long as the control relay R4 maintains the synchronizing transformer T9 in an energized condition.

At a time which falls between the lines e and f in FIG. 3, control relay R4 resumes the de-energized position and re-opens its contacts R4a, it being recalled that relay R4 is de-energized as a consequence of the expiration of the on period determined by condenser C2, associated with relay R2. The just-mentioned interval between the lines e and f in FIG. 3 amounts to approximately 360 electrical degrees, and this range is found to be well within the operating accuracy of condenser C2 and relays R2 and R4.

The opening of contacts R4a de-energizes the transformer T9. Accordingly, although at the time represented by the line f in FIG. 3, the peaking transformer T11 again applies a peaked potential to the grid of valve V4, such action is without effect because such peaked potential is sufficiently overcome by the now unneutralized transformer T10. The de-energization of relay R4 consequently initiates an off period during which V4 remains nonconductive and during which, consequently, main rectifiers MV1 and MV2 are not fired. As aforesaid, condenser C5, associated with impulsing valve V2, is effective to maintain relay R2 de-energized for an off period of variably determinable length, which, in the present example, is assumed to be three full cycles. At a time which may fall anywhere between the doted lines, designated g and a' in FIG. 3, the re-energization of relay R2 causes relay R4 to again become energized. The just-mentioned interval between the lines g and a' is approximately 360 electrical degrees in length, which interval is found in the practice to be well within the accuracy of the timing condenser C5 and relays R2 and R4.

Upon being re-energized, relay R4 again closes its contacts R4a, which contacts remain closed throughout another on period, as determined by relay R2, and during which on period rectifiers MV1 and MV2 are again successively fired in the same manner as was described in detail with reference to the first on period. Throughout the second on period, however, by virtue of the discharging of the condensers C20 and C21, transformers T17 and T18 are effective to fire their associated valves V7 and V8 at an earlier stage in each half-cycle, and consequently each increment of current delivered to the welding transformer during the second on period is of greater length and of a higher value than was the case during the first on period. This increase in current intensity is indicated in FIG. 3 by the greater area of the hatched areas.

At the conclusion of the second on period, relay R4 is again de-energized, throughout a predetermined off period, as a consequence of the de-energization of relay R2. Following this second off period, a third on period is initiated in the previously described manner. Since the condensers C20 and C21 are progressively decreasing in charge, the main rectifiers MV1 and MV2 will be fired at a still earlier stage of the welding current wave. It will be understood, of course, that the potentiometer circuit associated with transformers T17 and T18 enables the firing point of the main rectifiers to be varied between a point only a few electrical degrees in advance of the end of each half-cycle of voltage and a point at which current is conducted to the welding circuit throughout all of each half-cycle of the current wave.

It is believed to be apparent that so long as transformer T3 is energized, it causes relay R2 to alternate between the energized and de-energized conditions, thus determining successive on and off periods. Moreover, each on period is made up of a predetermined number of half-cycles of one polarity and an equal number of half-cycles of the opposite polarity. The same is true of each off period. The proportion of each half-cycle during which current flows to the welding circuit, also, is determined by the grid to cathode bias on the valves V13 and V14 which is reduced at a rate determined by the value of the resistors R20 and R21 respectively and causes such fractions to progressively increase from a desired minimum value to a desired maximum value.

As is indicated in FIG. 3, it is assumed that the total welding period, as determined by relay R3, amounts to three on periods, and consequently, the sequencing circuits are adjusted to cause relay R3 to become energized at approximately the time represented by the line h in FIG. 3.

It will be recalled that the initial closure of the pressure switch contacts PSa completes an energizing circuit for the transformer T7, associated with the grid of valve V3. Upon being energized, transformer T7 neutralizes the effect of transformer T6 and enables the energy initially stored in the associated timing condenser C3 to discharge through the resistor R4. Condenser C3 and resistor R4 thus determine the period, after the closure of the pressure switch PS, throughout which valve V3 remains non-conductive. At the expiration of this period, which occurs, as aforesaid, at approximately the time represented by the line h in FIG. 3, valve V3 becomes conductive and enables transformer T4 to energize relay R3.

Upon being energized, relay R3 opens its contacts R3b and closes its contacts R3a. The opening of contacts R3b interrupts the energizing circuit for transformer T3 and thus prevents further energizations of the impulsing relay R2.

Closure of relay contacts R3a also completes energizing circuits for the hold-time lamp 40 and the primary winding of transformer T2, associated with valve V1. Upon completion of the latter circuit, transformer T2 is enabled to charge condenser C1 to a potential sufficient to interrupt further flow of current through valve V1. In consequence of this action, the hold-time condenser C1', associated with relay R1, is enabled to discharge through the coil of relay R1 and maintain relay R1 energized for a variably determinable period. This hold-time period, as will be understood, is sufficient to allow the work to cool sufficiently to perfect the weld.

At the expiration of the hold-time period, relay R1 times out and opens its contacts R1a and R1b. It is to be expected that the pilot switch B will be open at the time contacts R1a and R1b open, and consequently the de-energization of relay R1 interrupts the circuit for the electrode controlling valve solenoid 34 and transformer T1. The former action relieves the electrode pressure upon the work and also results in the opening of the pressure switch, as will be understood. The opening of the pressure switch interrupts the circuits for transformer T2, hold-time lamp 40, the energizing circuit for the transformers T22 and T23, and transformers T3 and T4, thereby restoring the sequencing circuits and charge on the condensers C20 and C21 to the conditions which existed immediately prior to the closure of the pilot switch B.

With the change-over switch S3 in the indicated closed position, a duplicate welding cycle may immediately be initiated by reclosing the pilot switch B. It will be understood that if the changeover switch S3 is opened, pilot switch B is rendered ineffective to energize the valve solenoid 34. In such case, the circuit for solenoid 34 is entirely subject to the reclosure of contacts R1a. The energization of transformer T2, which resulted in the blocking of valve V1, also charged the associated timing condenser C1' which remains effective after the pressure switch PS has opened and deenergized transformer T2 to maintain valve V1 in a blocked condition for a predetermined interval between welding cycles. Assuming the pilot switch B is closed at the expiration of the last-mentioned interval, a new welding cycle is initiated, which duplicates in all respects the previously described cycle.

In the form of the invention shown in FIG. 1, the valves V13 and V14 were individually controlled by means of a grid to cathode bias individually applied to these valves by means of the capacitors C20 and C21 respectively. In the form of the invention shown in FIG. 4, a single capacitor C20a acts to control the grid to cathode bias on both of the valves V13 and V14. Like reference characters have been used to identify like parts, as shown in FIG. 1.

It will be observed that the phase shifting network of FIG. 4 is provided with the transformers T17 and T18 which act to render the valves V7 and V8 conductive at the desired phase shift angle in accordance with the resistance in the phase shifting network provided by the valves V13 and V14. The cathode of the valve V13 is connected through a resistor R50 to a conductor 50 and the cathode of the valve V14 is connected through a resistor R51 to this same conductor 50 which in turn is connected by means of branch conductor 51 to one terminal of the capacitor C20a. The other terminal of the capacitor C20a is connected to a conductor 52 which conductor is connected through resistors R52 and R53 to the grids of the valves V13 and V14 respectively whereby the potential appearing across the capacitor C20a controls the grid to bias voltage of both of the valves V13 and V14.

The potential across the capacitor C20a is provided from a rectifying network comprising a full wave rectifying valve V50 having its cathode directly connected to the branch conductor 51. The anodes of the valve V50 are connected individually to the end terminals of a center tapped secondary winding of transformer T50, the primary winding of which is connected between the lines L1 and L2. The cathode of valve V50 is connected to conductor 50. The center tap connection of the secondary winding of transformer T50 is connected through a resistor R54 to a conductor 53. A capacitor C50 is connected between the conductors 51 and 53 for the purposes of smoothing the voltage applied therebetween by the rectifying valve V50.

A pair of potentiometers Rr2 and Rr3 have their resistance windings connected in parallel between the conductors 51 and 53. The adjustable member Ia2 of the potentiometer Rr2 is connected through normally closed contacts PSc of the pressure switch PS to the conductor 52. The adjustable member Ia3 of the potentiometer Rr3 is connected through a variable resistor R55 and normally open contacts PSb of the pressure switch PS to the conductor 52. Under standby operation of the apparatus with the disconnect switches S1 and S2 closed but with the solenoid valve 34 de-energized the contacts PSc will be closed and the contacts PSb will be opened.

Under such conditions the capacitor $C_{20}$ will be charged to the same potential as appears between the setting of the adjustable member Ia2 of the potentiometer Rr2 from the conductor 51. Upon operation of the apparatus for performing a welding operation, the switch PS will be moved to its actuated position as described above in which the contacts PSc will be opened and the contacts PSb will be closed. This operation will cause the capacitor C20a to change in potential from the initial potential as described above to the final potential which is the same potential as appears between the conductor 51 and the adjustable member Ia3 of the potentiometer resistor Rr3. The rate at which this change in potential of the capacitor C20a occurs will be determined by the setting of the adjustable resistor R55 which obviously controls the rate of increase or rate of decrease of the welding current during the welding operation. The potentiometer resistor Rr2 therefore establishes the initial welding current while the potentiometer resistor Rr3 establishes the final welding current and the resistor R55 establishes the rate of change from the initial to the final welding current.

It will be appreciated that various modifications may be made in the herein described embodiment of the invention without departing from the spirit and scope of the invention.

What is claimed is:

1. A phase shifting network adapted to be energized from a continuous source of alternating voltage and to deliver a continuous alternating voltage the phase of which is adjustably controlled, comprising a pair of input and a pair of output terminals and impedance elements connected between said pairs of terminals, said elements including an electric valve having principal electrodes and a control electrode, said valve being of the continuous control type wherein the resistance to current flow between said principal electrodes varies in accordance with the magnitude of the direct voltage applied between said control electrode and one of said principal electrodes, said elements being so interrelated that the phase of the alternating voltage at one of said pairs of terminals will be shifted from the phase of the alternating voltage at the other of said pairs of terminals in accordance with the change in magnitude of said resistance between said principal electrodes, initiating means, and timing means including a source of direct voltage, reactance means and resistance means and effective in response to the operation of said initiating means for applying a direct voltage between said control electrode and said one of said principal electrodes having a magnitude which progressively changes in accordance with a preselected time pattern.

2. A phase shifting network adapted to be energized from a continuous source of alternating voltage and to deliver a continuous alternating voltage, the phase of which is adjustably controlled, comprising a pair of input and a pair of output terminals and impedance elements connected between said pairs of terminals, said elements including an electric valve having principal electrodes and a control electrode, said valve being of the continuous control type wherein the resistance to current flow between said principal electrodes varies in accordance with the magnitude of the direct voltage applied between said control electrode and one of said principal electrodes, said elements being so interrelated that the phase of the alternating voltage at one of said pairs of terminals will be shifted from the phase of the alternating voltage at the other of said pairs of terminals in accordance with the change in magnitude of said resistance between said principal electrodes, a source of direct voltage, energy storage means for receiving and storing energy from said direct voltage source, resistance means for controlling the rate of change of the magnitude of the energy in said energy storage device in accordance with a preselected time pattern, and timing means including said direct voltage source, said energy storage means and said resistance means for applying a direct voltage between said control electrode and said one of said principal electrodes having a magnitude which varies in accordance with the magnitude of the energy in said energy storage device.

3. The combination of claim 2 further including initiating means and in which said timing means is effective in response to and after the operation of said initiating means.

4. The combination of claim 3 in which said resistance means is manually adjustable to vary the interval over which the phase of the alternating voltage at said one of said pairs of terminals is changed with respect to the alternating voltage at the other of said pairs of terminals.

5. A phase shifting apparatus for association with a source of alternating voltage and a pair of output terminals comprising reactive means and resistive means for applying between said output terminals an output alternating voltage shifted in phase from the alternating voltage of the source by an amount determined by the values of said reactive means and said resistive means, initiating means, and selectively variable timing means effective in response to and after operation of said initiating means for varying the value of one of said reactive means and resistive means over a predetermined range of such values in accordance with a predetermined time pattern and within a selected time interval which is longer than the period of said alternating voltage.

6. The combination of claim 5 in which said one of said reactive and resistive means is said resistive means.

7. The combination of claim 6 in which said resistive means is a valve having principal electrodes and a control electrode and having the value of its resistance between said principal electrodes varied in accordance with the magnitude of a direct voltage applied between said control electrode and one of said principal electrodes and in which said timing means includes means for applying a direct voltage between said control electrode and said one of said principal electrodes having a magnitude which progressively changes in accordance with a preselected time pattern.

8. The combination of claim 5 in which said timing means progressively varies the value of one of said reactive means and resistive means in a plurality of discrete steps.

9. The combination of claim 8 in which the phase difference between the output alternating voltage at said output terminals and the alternating voltage of said source is decreased in accordance with said progressively varying value of one of said reactive means and resistive means.

10. The combination of claim 8 in which the phase difference between the output alternating voltage at said output terminal and the alternating voltage of said source is increased in accordance with said progressively varying value of one of said reactive means and resistive means.

11. The combination of claim 5 in which said timing means varies the value of one of said reactive means and resistive means as a continuous function of time and at a selectable and controlled time rate.

12. The combination of claim 11 in which the phase difference between the output alternating voltage at said output terminal and the alternating voltage of said source is decreased in accordance with said progressively varying values of one of said reactive means and resistive means.

13. The combination of claim 11 in which the phase difference between the output alternating voltage at said output terminals and the alternating voltage of said source is increased in accordance with said progressively varying value of one of said reactive means and resistive means.

14. A phase shifting apparatus for association with a source of alternating voltage and a pair of output terminals comprising reactive means and resistive means for applying between said output terminals an output alternating voltage shifted in phase from the alternating voltage of said source by an amount determined by the values of said reactive means and said resistive means, control means responsive to the magnitude of a direct voltage applied to the input terminals thereof to correspondingly vary the value of one of said reactive means and resistive means, initiating means, and selectively variable timing means effective in response to and after operation of said initiating means for applying a direct voltage to the input terminals of said control means having a magnitude progressively varying from a predetermined initial value to a predetermined different final value during a selectable time interval in accordance with a predetermined time pattern.

15. A phase shifting apparatus for association with a source of alternating voltage and a pair of output terminals comprising reactive means and resistive means for applying between said output terminals an output alternating voltage shifted in phase from the alternating voltage of said source by an amount determined by the values of said reactive means and said resistive means, control means responsive to the magnitude of a direct voltage applied to the input terminals thereof to correspondingly vary the value of one of said reactive means and resistive means, initiating means, a source of direct voltage, energy storage means for receiving and storing energy from said direct voltage source, resistance means for controlling the rate of change of the magnitude of the energy in said energy storage means in accordance with a preselected time pattern, and timing means including said direct voltage source, said energy storage means and said resistance means effective in response to and after operation of said initiating means for applying a direct voltage to the input terminals of said control means having a magnitude progressively varying from a predetermined initial value to a predetermined different final value during a selectable time interval in accordance with the magnitude of the energy in said energy storage means.

16. The combination of claim 15 in which said energy storage means is a capacitor and in which the direct voltage applied to the input terminals of said control means is derived from the energy stored by said capacitor.

17. In a network associable with gaseous discharge device having an output circuit energized from a source of alternating current and abruptly changing conductivity at points during the positive half cycles of the alternating current applied to the output circuit when the potential applied to an input circuit thereof reaches corresponding preselected control values, the combination of means for applying an alternatnig voltage to the input circuit of the gaseous discharge device, initiating means, and means effective in response to and after the operation of said initiating means for progressively shifting the points in the positive half cycles of the alternating current at which the alternating voltage applied to the input circuit of the gaseous discharge device reaches the corresponding preselected control value from a preselected initial point to a different predetermined final point during a selectable time interval longer than the period of said alternating current and in accordance with a preselected time pattern.

18. The combination of claim 17 in which said means for progressively shifting the points in the positive half cycles of the alternating current at which the alternating voltage applied to the input circuit of the gaseous discharge device reaches the corresponding preselected critical value includes a source of direct voltage, energy storage means for receiving and storing energy from said direct voltage source, and resistance means for controlling the rate of change of the mganitude of the energy in said energy storage means in accordance with a preselected time pattern, and in which said initiating means initiates a change of the magnitude of the energy in said energy storage means.

19. In combination, an electric valve having an anode, a cathode, and a control electrode, terminals for connection to an alternating voltage source, connections between the anode and cathode of said valve and said terminals and including a load controlling device actuable to modulate the energy supplied to a load as a function of the average magnitude of current conducted by said valve during the half cycle in which said valve conducts current, a pair of bias voltage applying conductors connected between said cathode and said control electrode, and means for applying a bias voltage to said conductors which varies in accordance with a predetermined time pattern comprising a source of direct voltage, energy storage means for receiving and storing energy from said direct voltage source, resistance means for controlling the rate of change of the magnitude of the energy in said energy storage means in accordance with a preselected time pattern, and means for varying the bias voltage applied to said conductor in accordance with the change of the magnitude of the energy stored in said energy storage means.

20. In combination, a plurality of electric valves each having an anode, a cathode and a control electrode, terminals for connection to an alternating voltage source, connections between the anodes and cathodes of said valves and said first terminals, means for applying a direct current bias to said valves, said means comprising a time constant circuit comprising a capacitor and a resistor connected to control the rate of change of charge of said capacitor, and means connecting the time constant circuit to at least one of said valves whereby said time constant circuit varies said bias in dependence on the charge on said capacitor.

21. In combination, an electric valve having an anode, a cathode, and a control electrode, terminals for connection to an alternating voltage source, connection between the anode and cathode of said valve and said terminals and including a load controlling device actuatable to modulate the energy supplied to a load as a function of the average magnitude of current conducted by said valve during the half cycle in which said valve conducts current, a pair of bias voltage applying conductors connected between said cathode and said control electrode, means including a direct potential time constant circuit for energizing said bias conductors with a potential so related to the conductive characteristics of said valve and to the potential supplied by said connections to the anode and cathode that the average magnitude of current conducted by said valve varies in accordance with the magnitude of said direct potential, said time constant circuit including a chargeable component and a component for controlling the change of the magnitude of the charge of said chargeable component at a predetermined rate whereby the magnitude of said direct potential bias bears a predetermined relation with respect to time.

22. The combination of claim 21 further including means for applying an alternating current to said bias conductors in addition to said direct potential.

23. A control circuit comprising a source of alternating voltage, a pair of terminals, phase shifting apparatus comprising reactive means and resistive means for applying between said terminals an output alternating voltage shifted in phase from the alternating voltage of said source by an amount determined by the values of said reactive means and said resistive means, means for producing a direct voltage signal having a magnitude which varies in accordance with a predetermined continuous time pattern over a period of time which is longer than the period of said alternating voltage, and control means responsive to said signal for varying the value of one of said reactive and resistive means in accordance with variations of the magnitude of said signal.

24. The combination of claim 23 in which said means for producing a signal comprises a source of direct voltage, energy storage means for receiving and storing energy from said direct voltage source, and resistance means for controlling the rate of change of the magnitude of the energy in said energy storage means, and in which the magnitude of said direct voltage signal varies in accordance with the change of the magnitude of the energy stored in said energy storage means.

25. A phase-shifting apparatus for association with a source of alternating voltage and a pair of output terminals comprising reactive means and resistive means for applying between said output terminals an output alternating voltage shifted in phase from the alternating voltage of the source by an amount determined by the values of said reactive means and said resistive means, said resistive means including a pair of vacuum tubes having control electrodes and constituting resistance elements, initiating means, means including a capacitor for imposing a control voltage onto the control electrodes of said vacuum tubes, and means effective in response to the operation of said initiating means for effecting a change of the charge of said capacitor at a predetermined rate whereby to shift the phase of said output alternating voltage at a predetermined rate and over a time interval which is longer than the period of said alternating voltage.

26. A phase shifting apparatus for association with a source of alternating voltage and a pair of output terminals comprising reactive means and resistive means for applying between said output terminals an output alternating voltage shifted in phase from the alternating voltage of the source by an amount determined by the values of said reactive means and said resistive means, said resistive means including a vacuum type electric discharge device responsive to variations in the potential of the control electrode thereof to vary the value of said resistive means to correspondingly shift the phase of said output alternating voltage, a first conductor connected to the control electrode of said electric discharge device, a second conductor connected to the cathode of said electric discharge device, and means for applying between said first and second conductors a direct voltage which gradually varies over a predetermined range of values in accordance with a predetermined time pattern for correspondingly gradually varying the phase of said output alternating voltage.

27. A phase shifting apparatus comprising a pair of input terminals adapted to have impressed thereacross a source of alternating potential, a pair of output terminals for providing an alternating output potential the phase whereof is regulatable with respect to that of said source, a first electrical potential device, circuit means connecting said device to one of said pairs of terminals, a network having a pair of series connected impedances and connected in series with at least a portion of said device, one of said pair of impedances being reactive, the other of said pair of impedances comprising an electric valve having principal electrodes and a control electrode and being of the continuous control type the resistance whereof is variable in accordance with a control potential established between said control electrode and one of said principal electrodes, an electrical storage device electrically connected between said control electrode and said one principal electrode to establish said control potential, means associated with said storage device and operable to control the magnitude of said control potential in accordance with a predetermined pattern, said potential device portion having an intermediate tap, a second circuit means connecting a point in said network intermediate said pair of impedances and connecting said tap to the other of said pairs of terminals.

28. A phase shifting apparatus comprising a pair of input terminals adapted to have impressed thereacross a source of alternating potential, a pair of output terminals for providing an alternating output potential the phase whereof is regulatable with respect to that of said source, a first electrical potential device, circuit means connecting said device to one of said pairs of terminals, a network having a pair of series connected impedances and connected in series with at least a portion of said device, one of said pair of impedances being reactive, the other of said pair of impedances comprising an electric valve having principal electrodes and a control electrode and being of the continuous control type the resistance whereof is variable in accordance with a control potential established between said control electrode and one of said principal electrodes, an electrical storage device electrically connected between said control electrode and said one principal electrode so that the potential across said storage device acts to establish said control potential, means for establishing initial and final potentials across said storage device and for causing said potential to change from said initial to said final value, said last-mentioned means including means for causing said change to occur at a controlled rate, said potential device portion having an intermediate tap, a second circuit means connecting a point in said network intermediate said pair of impedances and connecting said tap to the other of said pairs of terminals.

29. The combination including an electrical potential device having a pair of input terminals adapted to be connected to a source of alternating potential and having a pair of output terminals and an output terminal the potential of which is intermediate that of said pair of output terminals, a phase determining circuit having a pair of series connected impedances connected between said pair of output terminals, one of said impedances being reactive, the other of said impedances comprising an electric valve having principal electrodes and a control electrode and being of the continuous control type the resistance whereof is variable in accordance with a control potential established between said control electrode and one of said principal electrodes, an electrical storage element connected between said control electrode and said one principal electrode so that the charge thereof acts to establish said last-named potential, means associated with said storage element and operable to control the magnitude of charge thereof in accordance with a predetermined varying pattern, and an output circuit connected between said intermediate potential output terminal and said determining circuit at a point intermediate said series connected impedances.

30. The combination including an electrical potential device having a pair of input terminals adapted to be connected to a source of alternating potential and having a pair of output terminals and an output terminal of a potential intermediate that of said pair of output terminals, a phase determining circuit having a pair of series connected impedances connected between said pair of output terminals, one of said impedances being reactive in nature, the other of said impedances comprising a pair of reversely arranged electric valves, each said valve having a principal electrode and a control electrode and being of the continuous control type the resistance whereof is variable in accordance with a control potential established between said control electrode and said principal electrode, electric storage means connected between respective said control electrodes and said principal electrodes so that the potential across said means establishes said control potential, means establishing an initial potential across said storage means, means for rendering and initial potential establishing means ineffective to establish said initial potential and for establishing a final potential across said storage means, means for controlling the time interval required for said storage means to change from said initial potential to said final potential, and an output circuit connected between said intermediate potential output terminal and a point in said phase determining circuit intermediate said impedances.

31. A phase-shifting network for delivering an alternating potential of a phase different from that of the alternating potential source to which said network is connected comprising, a pair of input connections for connection with such source, a transformer having a primary winding and a secondary winding with outer end terminals and a center terminal, means connecting said primary winding to said input connections, a reactive component, a pair of vacuum type electric valves each having an anode and a cathode and a control electrode, said valves being connected in back-to-back relation with each other, circuit means connecting said back-to-back valves and said reactive component in series with each other and between said outer end terminals, a pair of output terminals, conductors connecting one of said output terminals to said center terminal and the other of said output terminals to said series circuit means intermediate said back-to-back valves and said reactive component, and means for controlling the bias potential between said grids and said cathodes.

32. The combination of claim 31 in which said last-named means comprises a pair of bias circuits, one of said bias circuits being connected between said grid and said cathode of one of said valves, the other of said bias circuits being connected between said grid and said cathode of the other of said valves, each said bias circuit including an energy storage component and a discharge component, a common circuit for normally maintaining said storage components charged and actuatable to a state in which said storage components are permitted to concurrently discharge through their respective said discharge component.

33. A phase-shifting network for delivering an alternating potential of a phase different from that of the alternating potential source to which said network is connected comprising, a pair of input connections for connection with such source, a transformer having a primary winding and a secondary winding with outer end terminals and a center terminal, means connecting said primary winding to said input connections, a reactive component, asymmetric current conducting means comprising a pair of triodes each of which is positioned in an evacuated space, each said triode having a pair of main electrodes and a control electrode, circuit means connecting said main electrodes of each of said triodes in series with said reactive component, said circuit means being connected across said outer end terminals, one of said triodes being arranged to conduct current in one direction between said outer end terminals and the other of said triodes being arranged to conduct current in a direction opposite to said one direction between said outer end terminals, a pair of output terminals, conductors connecting one of said output terminals to said center terminal and the other of said output terminals to said circuit means intermediate said triodes and said reactive component, and at least one energy storage device for controlling the bias potential between one of said grids and one of said cathodes as a function of the charged condition of said storage device.

34. A phase-shifting network comprising, a pair of input connections for connection to a source of alternating current, a potential splitting device having a pair of input conductors connected to said input connections and having three output conductors, a reactive component having a pair of terminals, an asymmetric current conducting means of the evacuated type comprising a pair of triodes, each said triode having a pair of main electrodes and a control electrode, a circuit connecting said reactive component and said asymmetric means between a first two of said three output conductors, and circuit including a first means connecting one of said terminals to one of said two output conductors and a second means connecting one of said main electrodes of each of said triodes to the other of said terminals of said reactive component and a third means connecting the other of said pair of main electrodes of each of said triodes to the second of said two output conductors, a pair of output connections adapted to supply an output potential derived from said input connections, means connecting one of said output connections to the third of said output conductors, means connecting the other of said output connections to said circuit intermediate said one main electrode and said other terminal of said reactive component, and means connected between a first of said main electrodes and said control electrode of each of said triodes for applying a control bias potential to each of said triodes.

35. A phase-shifting network comprising, a pair of input connections for connection to a source of alternating current, a potential splitting device having a pair of input conductors connected to said input connections and having three output conductors in which the potential between two of said three conductors is the sum of the voltage appearing between a first of said two conductors and the third of said conductors and of the voltage appearing between said third conductor and the second of said two conductors, a reactive component having a pair of terminals, an evacuated type asymmetric current conducting means comprising a pair of triodes, each said triode having an anode and a cathode and a control electrode, a circuit connecting said reactive component and said asymmetric means between said first and said second output conductors, said circuit including a first means connecting one of said terminals to said first output conductor and a second means connecting said anode of one of said triodes and said cathode of the other of said triodes to the other of said terminals of said reactive component and a third means connecting said cathode of said one triode and said anode of said other triode to said second output conductor, a pair of output connections adapted to supply an output potential derived from said input connections, means connecting one of said output connections to said third output conductor, means connecting the other of said output connections to said circuit intermediate said other terminal of said reactive component and said anode of said one triode and said cathode of said other triode, and means connected between said cathode and said control electrode of each of said triodes for applying a control bias potential to each of said triodes.

36. A phase-shifting network comprising, a pair of input connections for connection to a source of alternating current, a potential splitting device having a pair of input conductors connected to said input connections and having three output conductors in which the potential between two of said three conductors is the sum of the voltage appearing between a first of said two conductors and the third of said conductors and of the voltage appearing between said third conductor and the second of said two conductors, a reactive component having a pair of terminals, a pair of asymmetric current conducting means at least one of said means comprising a triode located in an evacuated space, said triode having a pair of main electrodes and a control electrode, a circuit connecting said reactive component and each of said asymmetric means between said first and said second output conductors, said circuit including a first means connecting one of said terminals to said first output conductor and a second means connecting one of said main electrodes of said triode to the other of said terminals of said reactive component and a third means connecting the other of said pair of main electrodes of said triode to the said second output conductor, the other said asymmetric means being connected in back-to-back relation with said triode, a pair of output connections adapted to supply an output potential derived from said input connections, means connecting one of said output connections to the third of said output conductors, means connecting the other of said output connections to said circuit intermediate said one main electrode and said other terminal of said reactive component, and means connected between a first of said main electrodes and said control electrode of said triode for applying a control bias potential to said triode.

37. A network comprising input terminals adapted to be energized from a source of alternating potential, impedance elements interposed between a pair of said terminals, said impedance elements including a pair of electric valves connected to pass current during alternate half cycles of the voltage of said source, each said valve having a control electrode and a main electrode, a direct potential time-constant bias controlling network, said network including energy storage means and a resistor connected to discharge said storage means, and means interconnecting said bias controlling network with said control electrode and said main electrode of at least one of said valves whereby the conductive condition of at least said one valve is varied in accordance with a predetermined time pattern.

38. A combination of claim 37 in which said storage means is a capacitor and said resistor is connected in a circuit which is in shunt with said capacitor.

39. A combination of claim 38 in which there is provided a charging circuit for said bias controlling network and selectively operable means to render said charging circuit ineffective whereby to initiate said discharge of said capacitor.

40. The combination of claim 37 in which said valves each include a second main electrode, there is provided a second storage means connected in series circuit with said main electrodes of said valves, and there is provided a load circuit connected between one of said input terminals and at least one of said second main electrodes.

41. In combination, a plurality of electric valves each having an anode, a cathode and a control electrode, terminals for connection to an alternating voltage source, connections between the anodes and cathodes of said valves and said first terminals, means for applying a direct current bias to said valves, said means comprising a time constant circuit comprising a capacitor and a resistor connected to control the rate of change of charge of said capacitor, and means connecting the time constant circuit to at least one of said valves whereby said time constant circuit varies said bias in dependence on the charge on said capacitor.

42. In combination, a plurality of electric valves each having an anode, a cathode and a control electrode, terminals for connection to an alternating voltage source, connections between the anodes and cathodes of said valves and said first terminals, modulating means for applying a direct current bias to said valves to vary the magnitude of the average current passed thereby in proportion to the magnitude of said bias, said means comprising a time constant circuit comprising a capacitor and a resistor connected to discharge said capacitor, and means connecting the time constant circuit to at least one of said valves whereby the discharge of said time constant circuit varies said bias in dependence on the charge on said capacitor.

43. In combination, an electric valve having an anode, a cathode, and a control electrode, terminals for connection to an alternating voltage source, connections between the anode and cathode of said valve and said terminals and including a load controlling device actuatable to modulate the energy supplied to the load as a function of the average magnitude of current conducted by said valve during the half cycle in which said valve conducts current, a pair of bias voltage applying conductors connected between said cathode and said control electrode, means including a direct potential time constant circuit for energizing said bias conductors with a potential so related to the conductive characteristics of said valve and to the potential supplied by said connections to the anode and cathode that the average magnitude of current conducted by said valve varies in accordance with the magnitude of said direct potential, said time constant circuit including a chargeable component and a component for changing the charge of said chargeable component at a predetermined rate whereby the magnitude of said direct potential bias bears a predetermined relation with respect to time.

44. The combination of claim 43 in which there is provided a second valve connected to conduct current during the opposite half cycles to which said first-named valve conducts and in which there are provided bias voltage conductors connected between the control element and cathode of said second valve energized at least in part from a direct potential source which varies as a function of time for modulating the average magnitude of current conducted by said second valve during said opposite half-cycles.

45. In apparatus for controlling the flow of electric power from an alternating current source and having translating means for transmitting predetermined portions of successive half-cycles of the alternating current of the source in response to the application of periodic current impulses bearing predetermined phase relation to the voltage wave of the source, the improvement of an electrical circuit assembly for furnishing said impulses comprising an alternating current supply synchronized with said source, a first discharge circuit connected across said supply and comprising in series a discharge device and parallel related resistance and capacitor connected to the cathode thereof, a second discharge circuit connected across said supply and comprising in series an impulse generator and a grid-controlled discharge device, said capacitor being connected across the cathode and control grid of said last named discharge device to maintain said device conducting for at least one half cycle following interruption of conduction in said first discharge circuit.

46. In a network associable with a gaseous discharge device having an output circuit energized from a source of alternating current and abruptly changing conductivity at points during the positive half cycles of the alternating current applied to the output circuit when the potential applied to an input circuit thereof reaches corresponding preselected control values, the combination of means for applying an alternating voltage to the input circuit of the gaseous discharge device, initiating means, and means effective in response to and after the operation of said initiating means for progressively shifting the points in the positive half cycles of the alternating current at which the alternating voltage applied to the input circuit of the gaseous discharge device reaches the corresponding preselected control value from a preselected initial point to a different predetermined final point during a selectable time interval and as a continuous function of time.

47. The combination of claim 46 in which said means for progressively shifting the points in the positive half cycles of the alternating current at which the alternating voltage applied to the input circuit of the gaseous discharge device reaches the corresponding preselected control value includes a source of direct voltage, energy storage means for receiving and storing energy from said direct voltage source, and resistance means for controlling the rate of change of the magnitude of the energy in said energy storage means in accordance with a preselected time pattern, and in which said initiating means initiates a change of the magnitude of the energy in said energy storage means References Cited in the file of this patent

UNITED STATES PATENTS

| | | |
|---|---|---|
| 2,463,463 | Izenour | Mar. 1, 1949 |
| 2,474,886 | Bovey | July 5, 1949 |

UNITED STATES PATENT OFFICE

CERTIFICATE OF CORRECTION

Patent No. 3,078,390 February 19, 1963

Gustav E. Undy

It is hereby certified that error appears in the above numbered patent requiring correction and that the said Letters Patent should read as corrected below.

Column 11, line 2, for "doted" read -- dotted --; column 13, line 20, for "$C_{20}$" read -- C20 --; column 15, line 71, for "alternatnig" read -- alternating --; column 19, line 11, and column 20, line 13, for "and", each occurrence, read -- said --.

Signed and sealed this 1st day of October 1963.

(SEAL)
Attest:

ERNEST W. SWIDER

Attesting Officer

DAVID L. LADD

Commissioner of Patents